United States Patent
Ueno et al.

(10) Patent No.: US 7,032,195 B2
(45) Date of Patent: Apr. 18, 2006

(54) NOISE SUPPRESSION COMPONENT SELECTING METHOD AND PROGRAM

(75) Inventors: Haruhiko Ueno, Sabae (JP); Kazuyuki Doshita, Yokohama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 278 days.

(21) Appl. No.: 10/755,312

(22) Filed: Jan. 13, 2004

(65) Prior Publication Data

US 2004/0143804 A1    Jul. 22, 2004

(30) Foreign Application Priority Data

Jan. 17, 2003  (JP)  ............................. 2003-009369
Oct. 3, 2003   (JP)  ............................. 2003-345901

(51) Int. Cl.
*G06F 17/50* (2006.01)
*G06F 17/10* (2006.01)

(52) U.S. Cl. ................... 716/4; 716/2; 703/2
(58) Field of Classification Search ............ None
See application file for complete search history.

(56) References Cited

U.S. PATENT DOCUMENTS 6,950,997 B1 * 9/2005 Dickey et al. .................. 716/2

2001/0048298 A1 * 12/2001 Doshita et al. .......... 324/76.21
2005/0165879 A1 *  7/2005 Nikitin et al. .............. 708/805

FOREIGN PATENT DOCUMENTS

JP          2001-265848          9/2001

OTHER PUBLICATIONS

Official Communication dated Sep. 23, 2005 issued in the corresponding Chinese Application No. 2004/0007326.3 (with English translation).

* cited by examiner

*Primary Examiner*—Leigh M. Garbowski
(74) *Attorney, Agent, or Firm*—Keating & Bennett, LLP

(57) ABSTRACT

In a method of selecting a suitable noise suppression component, an input signal to a digital circuit including a transmitter IC, a noise suppression filter, a transmission line, and a receiver IC is expanded by Fourier expansion so as to express the input signal in terms of a series sum of sine waves. The Fourier-expanded input signal and the circuit constants of the digital circuit are used to calculate a signal on the input side of the receiver IC. Similar calculation is performed for all possible filters to assign scores for each of fundamental and harmonic components of the signal, while considering both the noise suppressing effect and the signal waveform quality. Total scores are calculated, and the filters are ranked from a high score to a low score.

16 Claims, 4 Drawing Sheets

NOISE SUPPRESSION COMPONENT SELECTING METHOD AND PROGRAM

BACKGROUND OF THE INVENTION

1. Field of the Invention

The present invention relates to a noise suppression component selecting method and program, and more particularly, to a noise suppression component selecting method and program for selecting one of a plurality of noise suppression components for suppressing noise in, for example, a digital circuit.

2. Description of the Related Art

A noise analysis method for a digital circuit including digital ICs (integrated circuits), a noise suppression filter, and a transmission line is known in which an input signal to the digital circuit is expanded into a series of sine waves by Fourier expansion. In this method, circuit constants of the digital ICs, the noise suppression filter and the transmission line are input to a computer having a noise analysis program installed therein so as to determine the transfer function of the digital circuit. Based on the transfer function of the digital circuit and the Fourier-expanded input signal, a frequency-domain output spectrum of the digital circuit is obtained. The output spectrum is transformed into a time-domain output waveform by an inverse Fourier transform.

In this analysis method, an input signal, which is subjected to Fourier expansion, is expressed in terms of a series sum of sine waves, thus enabling circuit analysis by simple linear computation. Therefore, the signal waveform of the digital circuit is easily determined. Once circuit constants of a noise suppression filter are stored as data, the effects of the filter are simulated simply by selecting a filter type (see, for example, Japanese Unexamined Patent Application Publication No. 2001-265848).

Generally, circuit analysis apparatuses analyze a signal waveform of a digital circuit including a noise suppression filter to analyze noise suppressing effects of the filter. In order to select a filter suitable for the digital circuit, several filters which are expected to have noise suppressing effects must be selected and analyzed to determine the filter to be used from the selected filters by comparing signal waveforms.

When a filter is incorporated in a circuit, the current in the line into which the filter is incorporated is suppressed, and noise is reduced. However, this also affects a signal transmitted on this line, and the signal waveform can be distorted. In comparing analyzed signal waveforms, therefore, such an influence on the signal waveforms must be considered in addition to the noise suppressing effects. Thus, a filter suitable for the digital circuit must be selected in view of both the noise suppressing effects and the influence on signal waveforms. In other words, the filter must be selected empirically and intuitively. This is very difficult for persons unfamiliar with noise countermeasures, and it takes a long time to determine which filter is suitable for the digital circuit.

SUMMARY OF THE INVENTION

In order to overcome the problems described above, preferred embodiments of the present invention provide a noise suppression component selecting method and program in which noise suppression components suitable for a digital circuit from a plurality of noise suppression components are ranked and shown once circuit constants of a digital IC, a transmission line, and other components are set.

In one preferred embodiment of the present invention, a noise suppression component selecting method for selecting a noise suppression component suitable for noise suppression in a digital circuit includes a step of determining an amplitude and phase of a signal at a given position of the digital circuit when an input signal is input to the digital circuit, a step of determining an amplitude and phase of a signal at the given position when the input signal is input to the digital circuit in the case where the circuit includes each of a plurality of noise suppression components, a comparing step of comparing, for each order of fundamental and harmonic components, the amplitude and phase of the signal at the given position determined in the case where the digital circuit includes each noise suppression component and the amplitude and phase of the signal at the given position determined in the case where the digital circuit does not include each noise suppression component, a scoring step of scoring, for each order, the amplitude and phase obtained in the comparing step determined in the cases where the digital circuit includes each noise suppression component and does not include each noise suppression component, and a summing step of calculating a total score by summing the scored amplitude and phase by weighting for each order.

In the noise suppression component selecting method according to a preferred embodiment of the present invention, the input signal is preferably expanded into a series of sine waves by Fourier expansion before the signal is input to the digital circuit. In the scoring step, the signal at the given position is preferably scored based on noise suppression and the signal waveform quality of the signal at the given position. The noise suppression component selection method preferably further includes a ranking step of ranking the noise suppression components from high score to low score.

In the scoring step, preferably, different scoring standards are used depending upon the order of the fundamental and harmonic components of the signal at the given position so as to consider the noise suppression and the signal waveform quality.

A standard for ranking the noise suppression components by weighting the scores can be changed by focusing on at least one of the noise suppression in the signal at the given position and the signal waveform quality of the signal at the given position.

In another preferred embodiment of the present invention, a program enables a computer to execute a procedure A of recording a circuit constant of a digital circuit, a procedure B of expanding an input signal to the digital circuit into a series of sine waves by Fourier expansion, a procedure C of calculating a signal at a given position of the digital circuit using the circuit constant recorded in the procedure A when the input signal expanded into a series of sine waves in the procedure B is input, a procedure D of recording a circuit constant of the digital circuit where the circuit includes one of a plurality of noise suppression components, a procedure E of calculating a signal at the given position of the digital circuit using the circuit constant recorded in the procedure D when the input signal expanded into a series of sine waves in the procedure B is input, a procedure F of determining a difference between the signal obtained in the procedure C and the signal obtained in the procedure E, a procedure G of scoring an amplitude and phase of the signal difference determined in the procedure F for each harmonic order, a procedure H of calculating a total score which is a sum of the scores obtained in the procedure G, a procedure I of implementing the procedures D through G for all of the plurality of noise suppression components to determine the total score in the case where each of the noise suppression components is used, and a procedure J of ranking the noise suppression components from the high-score noise suppression component based on the total scores obtained in the procedure I.

In still another preferred embodiment of the present invention, a program enables a computer to execute a procedure K of recording a circuit constant of a digital circuit, a procedure L of expanding an input signal to the digital circuit into a series of sine waves by Fourier expansion, a procedure M of recording a circuit constant of the digital circuit in the case where the circuit includes one of a plurality of noise suppression components, a procedure N of calculating a signal at a given position of the digital circuit using the circuit constant recorded in the procedure M when the input signal expanded into a series of sine waves in the procedure L is input, a procedure O of determining a difference between the input signal expanded into a series of sine waves in the procedure L and the signal obtained in the procedure N, a procedure P of scoring an amplitude and phase of the signal difference determined in the procedure O for each harmonic order, a procedure Q of calculating a total score which is the sum of the scores obtained in the procedure P, a procedure R of implementing the procedures M through Q for all of the plurality of noise suppression components to determine the total score when each of the noise suppression components is used, and a procedure S of ranking the noise suppression components from high score to low score based on the total scores obtained in the procedure R.

In the program, preferably, the amplitude and phase are scored using different scoring standards depending upon each harmonic order.

The total score may be calculated by weighting for each harmonic order.

The weighting by which the scores are determined may be changed by focusing on at least one of noise suppression in the signal at the given position of the digital circuit and the signal waveform quality of the signal at the given position.

In still another preferred embodiment of the present invention, a computer-readable recording medium includes the above-described program recorded thereon.

In still another preferred embodiment of the present invention, a noise suppression component selecting apparatus includes a computer in which the above-described program is installed.

Accordingly, an input signal is input to a digital circuit in the case where the circuit includes a noise suppression component and in the case where the circuit does not include a noise suppression component, and signals at a given position of the circuit are calculated and compared. This permits a user to determine and observe a change of the signal caused by the noise suppression component. The amplitude and phase of the signal at the given position of the digital circuit are scored for each order of the fundamental and harmonic components so as to account for noise suppression and the signal waveform quality. A total score is calculated by weighting the scores for each order, such that a standard for calculating the total score is determined.

In the noise suppression component selecting method according to various preferred embodiments of the present invention, an input signal is expanded by Fourier expansion, which allows the amplitude and phase of a signal at a given position of a digital circuit which includes a noise suppression circuit to be determined by simple linear computation. This calculation is performed for a plurality of noise suppression components such that the signal amplitude and phase at the given position are scored considering both noise suppression and the signal waveform quality. The noise suppression components are ranked from high score to low score, thus facilitating selection of a suitable noise suppression component for the digital circuit.

The signal amplitude and phase at the given position of the digital circuit are scored using different scoring standards depending upon the order of the fundamental and harmonic components, which provides a more detailed evaluation of the noise suppression and the signal waveform quality.

The total score may be calculated by weighting for each order such that the standard for ranking the noise suppression components is easily changed. This standard may focus on at least one of noise suppression and the signal waveform quality in the signal at the given position.

In a program for enabling a computer to execute the noise suppression component selecting method, an input signal is expanded by Fourier expansion, and signals at a given position of a digital circuit in the case where the circuit includes a noise suppression component and in the case where the circuit does not include a noise suppression component are calculated. The difference between the signals is determined, and the amplitude and phase are scored for each harmonic order. This computation is performed for all of a plurality of noise suppression components, and the obtained scores are compared so as to rank the noise suppression components.

If, due to resonance, a harmonic amplitude considerably increases when no noise suppression component is provided, thus causing signal waveform distortion, such as ringing, the difference between the input signal and the signal obtained when a noise suppression component is provided is determined for scoring.

In the program, the amplitude and phase can be scored using different scoring standards depending upon each order of the fundamental and harmonic components of the signal, thus providing evaluation in consideration of both noise suppression and the signal waveform quality.

The total scores for noise suppression components are calculated by weighting, which enables the noise suppression components to be ranked in view of, for example, noise suppression or the signal waveform quality.

The program can be recorded in a recording medium for distribution of the program.

By installing the program in a computer, the computer can be used as a noise suppression component selecting apparatus.

According to preferred embodiments of the present invention, a user of a digital circuit is able to easily select a suitable noise suppression component for the digital circuit from a plurality of noise suppression components. By weighting the scores of the noise suppression components, a selection standard desired by the person who selects the component, such as a selection standard focusing on the noise suppression effect or a selection standard focusing on the signal waveform quality, can be obtained.

The foregoing features, elements, steps, characteristics and advantages of the present invention will become more apparent from the following description of preferred embodiments of the present invention taken in conjunction with the drawings.

DETAILED DESCRIPTION OF PREFERRED EMBODIMENTS

Figure 1:
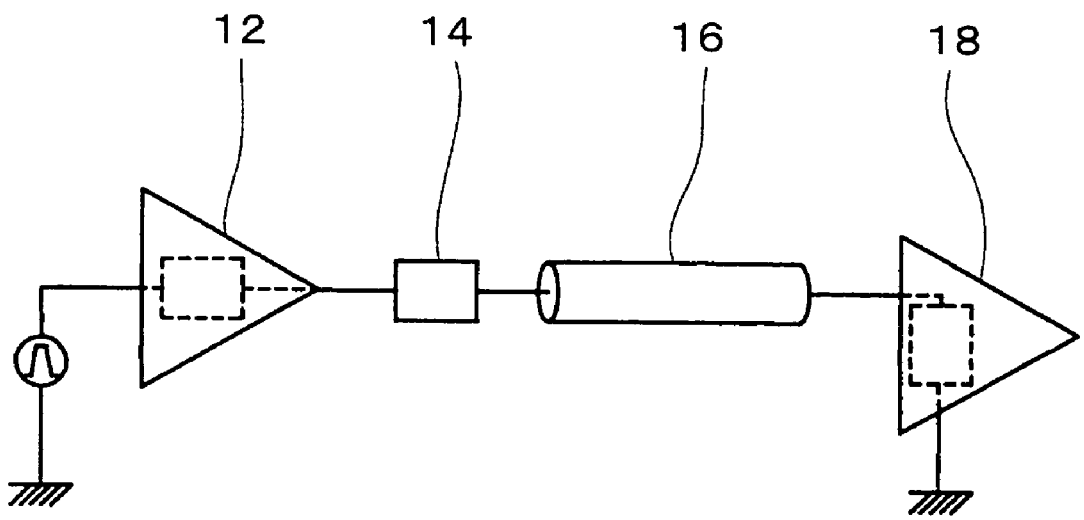
FIG. 1 is a circuit diagram of a digital circuit for simulating the effects of a noise suppression component by executing a program according to a preferred embodiment of the present invention.

An apparatus for selecting a noise suppression component suitable for a digital circuit from a plurality of noise suppression components according to a method of a preferred embodiment of the present invention is defined by a computer having a noise suppression component selecting program installed therein. FIG. 1 shows a digital circuit 10 which defines a simulation circuit. The digital circuit 10 provides noise analysis preferably for a circuit having digital ICs. The digital circuit 10 includes a transmitter IC 12, a filter 14 defining a noise suppression component, a transmission line 16, and a receiver IC 18. The transmission line 16 is a wiring substrate incorporating digital ICs. An input signal is input to the transmitter IC 12.

Figure 2:
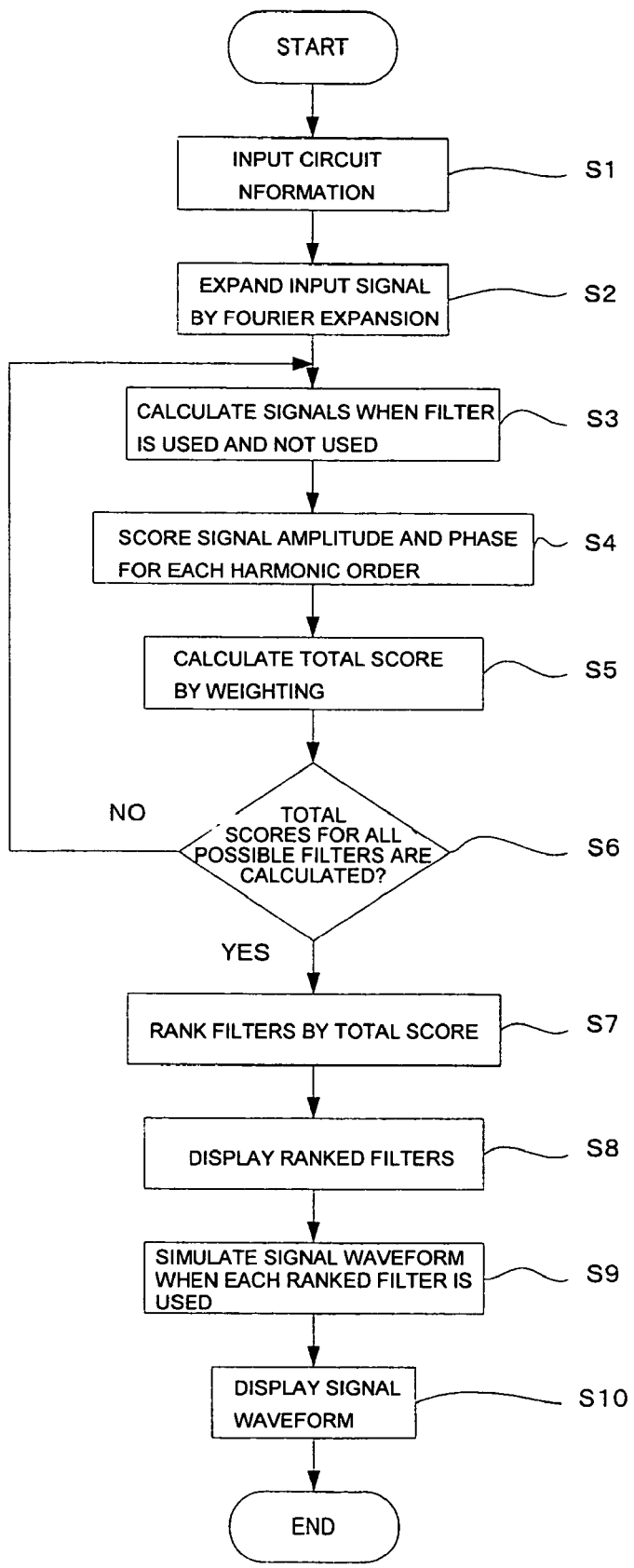
FIG. 2 is a flowchart of a noise suppression component selecting method according to a preferred embodiment of the present invention.

The digital circuit 10 is shown, for example, on a computer display. Referring to FIG. 2, in step S1, information regarding the digital circuit 10 is input and is recorded in memory. Information regarding the conditions of the input signal, such as the clock frequency, duty ratio, rise time, and fall time, is input. Such input signal information can be entered using any suitable input device, such as a keyboard.

Information regarding the transmitter IC 12 is also entered. The input information regarding the transmitter IC 12 includes the inductance, capacitance, and resistance of an equivalent LCR circuit in which the digital IC is formed of passive devices. The program includes, as data, inductances, capacitances, and resistances of a plurality of digital ICs. Once a digital IC used as the transmitter IC 12 is selected, the inductance, capacitance, and resistance of the selected digital IC is entered. An input device, such as a mouse, can be used to select a digital IC from a list of ICs shown on the display. In selecting a digital IC from the list, for example, an IC category, that is, either a CMOS type or a TTL type, is selected, and an item is then selected from the selected category. An input device, such as a keyboard, can be used to enter the values, such as the inductance, capacitance, and resistance, of the LCR circuit.

Furthermore, desired conditions are set to specify the filter for use. In specification of the filter, the type of filter, like a chip ferrite bead filter for example, is first selected. After the filter type is specified, a filter size is selected. In this manner, the filter type and size are selected so as to set all filters associated with the selected type and size as possible filters for use in the digital circuit 10.

The characteristic impedance and propagation constant of the transmission line 16, and the length of the transmission line 16 are also entered. The characteristic impedance and the propagation constant are determined from the line length, line width, substrate thickness, substrate material, and other factors. A program for determining the characteristic impedance, the propagation constant, and other values, from such values is installed, thus facilitating entry of the characteristic impedance, the propagation constant, and other values. The characteristic impedance, the propagation constant, and other values, are determined by a user, and are directly entered using an input device such as a keyboard. If another option in which the transmission line is omitted is prepared, the characteristic impedance and propagation constant of the transmission line 16 may be ignored for the noise analysis.

With respect to the receiver IC 18, similar to the transmitter IC 12, the inductance, capacitance, and resistance of an equivalent LCR circuit in which the digital IC is formed of passive devices are also entered. Likewise, these values can be entered by selecting an IC from a list of ICs stored as data in the program, or can be entered using an input device such as a keyboard.

In step S2, the input signal is expanded by Fourier expansion so as to be reduced to frequency components. A digital signal typically has a trapezoidal waveform. This signal is Fourier-expanded into harmonic components at integer multiples of the signal frequency, and is expressed as follows:

$$V_0 = C_0 + \sum_{n=1}^{\infty} |C_n| \sin(\omega_n t) \qquad \text{Eq. (1)}$$

where $\omega_n$ indicates the angular frequency, and $|C_n|$ indicates the magnitude of a component with the angular frequency $\omega_n$. Therefore, the Fourier-expanded input signal is expressed in terms of a sum of a plurality of sine waves.

In step S3, the signal is calculated for each of a case where the filter is provided and a case where the filter is not provided. Thus, one of the selected filters is automatically selected, and the impedance of the selected filter is input. The impedances of all filters may be stored as data in the program. The impedance of the selected filter is input from this data and is recorded into memory.

The output impedance $\dot{Z}_{out}(=R_{out}+jX_{out})$ of the transmitter IC 12, the impedance $\dot{Z}(=R+jX)$ of the filter 14, and the characteristic impedance $\dot{Z}_0$, propagation constant $\gamma$ and line length l of the transmission line 16, the input impedance $\dot{Z}_{in}(=R_{in}+jX_{in})$ of the receiver IC 18, and so on are obtained from the input information. Anecdotally, the mark "•" above a letter as is shown in $\dot{Z}$ represents a complex number. Based on such information, the circuit constants of the digital circuit 10 without the filter 14 and the circuit constants of the digital circuit 10 with the filter 14 are calculated and recorded into a memory or the like. Such conditions of the digital circuit 10 and the Fourier-expanded input signal are used to determine, for example, a voltage $\dot{V}_{receiver}$ at an input terminal of the receiver IC 18. The voltage $\dot{V}_{receiver}$ is given by the following equation:

$$\dot{V}_{receiver} = \frac{\dot{Z}_{in}\dot{Z}_0}{\dot{Z}_0\cosh(\gamma l) + \dot{Z}_{in}\sinh(\gamma l)} \frac{V_0}{\dot{Z}_{out} + \dot{Z} + \dot{Z}_1} \qquad \text{Eq. (2)}$$

where $\dot{Z}_1$ is given by the following equation:

$$\dot{Z}_1 = \frac{\dot{A}\dot{Z}_{in} + \dot{B}}{\dot{C}\dot{Z}_{in} + \dot{D}} \qquad \text{Eq. (3)}$$

where $\dot{A}$, $\dot{B}$, $\dot{C}$, and $\dot{D}$ are the elements of the F-matrix of the transmission line 16. The F-matrix is expressed as follows:

$$\begin{bmatrix} \dot{A} & \dot{B} \\ \dot{C} & \dot{D} \end{bmatrix} = \begin{bmatrix} \cosh(\dot{\gamma}l) & \dot{Z}_0\sinh(\dot{\gamma}l) \\ \sinh(\dot{\gamma}l)/\dot{Z}_0 & \cosh(\dot{\gamma}l) \end{bmatrix} \qquad \text{Eq. (4)}$$

Figure 3:
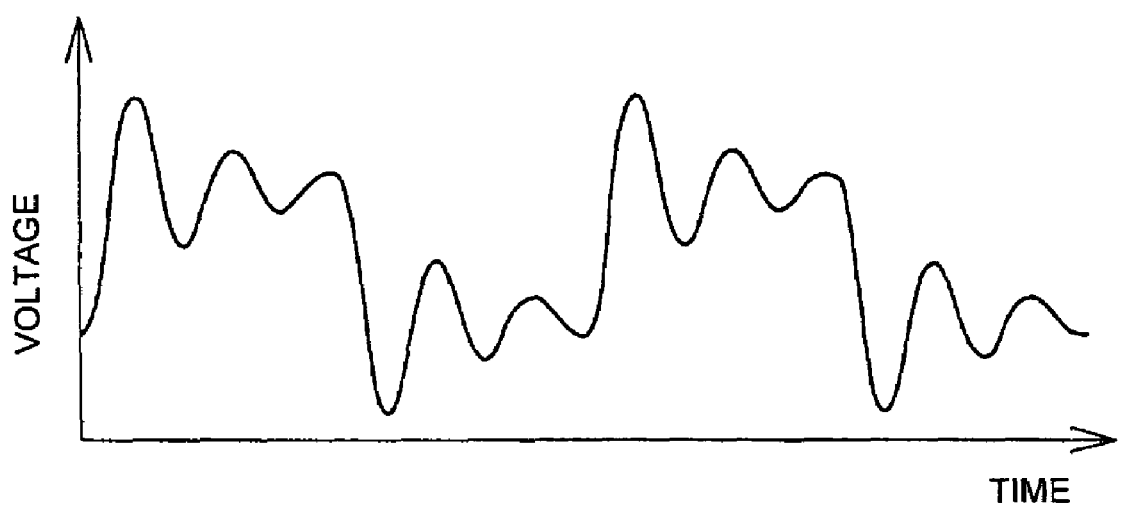
FIG. 3 is a graph depicting a signal waveform analyzed by the program according to a preferred embodiment of the present invention.
Figure 4:
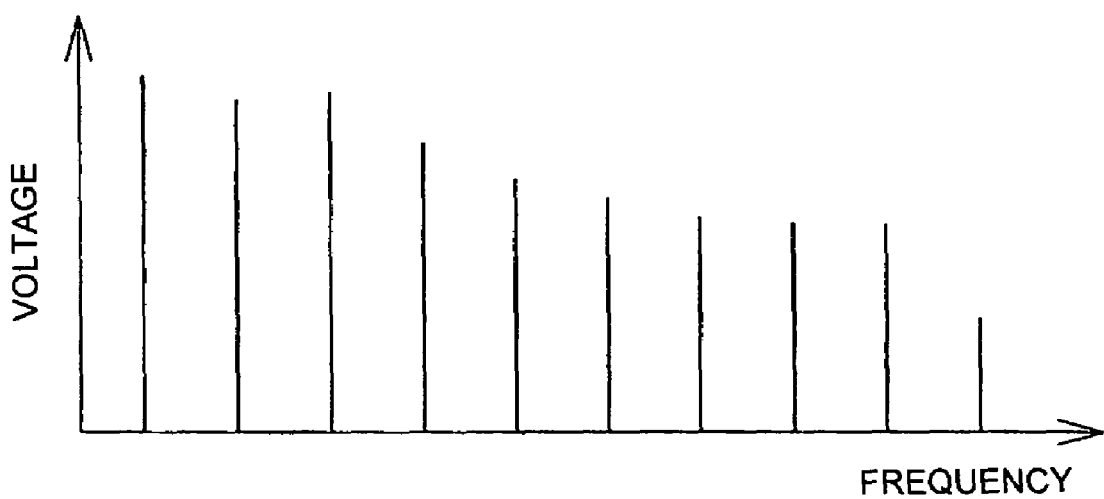
FIG. 4 is a graph depicting a voltage spectrum analyzed by the program according to a preferred embodiment of the present invention.

In calculating Equation (2), if the impedance of the digital circuit 10 or the filter 14 has frequency response, the respective values at a high frequency are required. The voltage $\dot{V}_{receiver}$ on the input side of the receiver IC 18 is determined by the above-described calculation. A voltage waveform for each of the fundamental and harmonic components of the input signal is obtained, and the sum is then subjected to an inverse Fourier transform to obtain a time-domain voltage waveform shown in FIG. 3. With respect to the magnitude $\dot{V}_{receiver}$ for each harmonic component, a voltage spectrum shown in FIG. 4 is obtained.

In step S3, the above-described analysis is performed for each of the cases where the filter 14 is used and not used. The results are compared to analyze the effects of the filter 14. The analysis for the case where the filter 14 is used and the analysis for the case where the filter 14 is not used are performed by using the circuit constants of the digital circuit 10 with the filter 14 and the circuit constants of the digital circuit 10 without the filter 14, respectively. The analysis is performed for all of the possible filters 14, and the filters 14 are ranked according to the results. In step S4, the signal obtained in the case where the filter 14 is used and the signal obtained in the case where the filter 14 is not used are expressed in terms of the amplitude and phase for each of the fundamental and harmonic components for evaluation.

In order to achieve noise suppression, the harmonic components must be reduced for the cases where the filter 14 is used and is not used. However, if the amplitude of low-order harmonic waves, such as up to fifth harmonic waves, greatly decreases, the signal waveform, which is a sum of harmonic waves, exhibits a reduction in amplitude or is degraded at rise/fall time. It is therefore desirable that the amplitude of such low-order harmonic waves does not substantially decrease.

Accordingly, scores are assigned for each of the fundamental and harmonic components, such that a point $P_1$ is given the fundamental (first harmonic) amplitude, a point $P_2$ the second harmonic amplitude, a point $P_3$ the third harmonic amplitude, ..., a point $P_n$ the n-th harmonic amplitude.

In this scoring method, for example, the difference between the signals at the input terminal of the receiver IC 18 in the cases where the filter 14 is used and not used is determined to obtain the amplitude difference for each of the fundamental and harmonic components. Then, the amplitude difference for each of the fundamental and harmonic components is scored. Basically, a high score is assigned in the noise-free state, i.e., the state where the harmonic components are reduced. However, as described above, the signal waveform is degraded when the low-order harmonic amplitude greatly decreases, and a high score should not be assigned where the fundamental and harmonic components are reduced, which causes degradation to the signal waveform. Thus, a scoring standard is determined empirically after the amount of noise reduction and the change in the signal waveform are measured for the cases where each of a plurality of filters is used and not used. The determined scoring standard is stored in advance as data in the program, and the amplitude is scored based on this data.

In some circuit conditions, due to resonance, a certain harmonic amplitude considerably increases when the filter 14 is not used, thus causing signal waveform distortion, such as ringing. In such cases, the effects of the filter 14 may not be sufficiently evaluated by the above-described scoring method, and a different scoring standard is required. This scoring standard is also determined empirically. Which scoring standard is used is determined by, for example, determining the difference between the amplitude of the signal at the input terminal of the receiver IC 18 in the case where the filter 14 is not used and the amplitude of the input signal to determine whether or not the difference exceeds a predetermined threshold.

If the difference between these amplitudes is below the threshold, it is determined that ringing is not produced. In this case, the difference between the amplitudes of the signals at the input terminal of the receiver IC 18 in the case where the filter 14 is used and in the case where the filter 14 is not used is determined, and the scoring standard described above is used for each of the fundamental and harmonic components. If the difference between the signal amplitude at the input terminal of the receiver IC 18 in the case where the filter 14 is not used and the amplitude of the input signal is greater than the threshold, it is determined that ringing is produced. In this case, the difference between the amplitude of the signal at the input terminal of the receiver IC 18 in the case where the filter 14 is used and the amplitude of the input signal is determined, and a second, different scoring standard is used for each of the fundamental and harmonic components.

The phase difference between the signals on the input side of the receiver IC 18 in the case where the filter 14 is used and in the case where the filter 14 is not used is also scored. The phase of low-order and odd-numbered-order harmonic waves affects the signal waveform. In general, the high-order harmonic waves and the even-numbered-order harmonic waves having a small amplitude have less effect on the signal waveform, and thus, the effect of the phase of such harmonic waves on the signal waveform is negligible. The difference of the fundamental (first harmonic) phases between the cases where the filter 14 is used and not used is determined to predict a signal delay caused by the filter 14. The third and fifth harmonic phases cause signal waveform distortion due to the deviation from the fundamental phase. Accordingly, scores are assigned such that a point $Q_1$ is provided for the fundamental phase, a point $Q_3$ is provided for the third harmonic phase, and a point $Q_5$ is provided for the fifth harmonic phase. A scoring standard for phase evaluation is also determined empirically by measuring the signal waveform distortion in the cases where each of a plurality of filters is used and not used.

In step S5, "Total", a total score of the scores regarding the harmonic amplitudes and phases determined in consideration of the noise suppressing effects and the effect on the signal waveform, is determined by the following equation:

$$\text{Total} = \sum_n a_n P_n + \sum_{n=1,3,5} b_n Q_n \qquad \text{Eq. (5)}$$

where $a_n$ and $b_n$ indicate weighting coefficients, which are dependent upon the expected degree of noise suppression, the effect on the signal waveform, and other factors. Each of the coefficients $a_n$ and $b_n$ is preferably set to a different value, for example, when focusing on noise suppression, when focusing on the signal waveform quality, and when balancing the noise suppression and the signal waveform quality. For example, when the filter 14 for use in the digital circuit 10 is specified, the focus on noise suppression, the signal waveform quality, or the balance therebetween is selected to determine the weighting coefficients used to calculate the total scores.

In step S6, whether or not the total scores are obtained for all possible filters is determined. If the total scores are not obtained for all possible filters, the operation in steps S3 through S5 is repeated until the total scores are obtained for all possible filters. The total scores are calculated using the initially entered values as the information about the components of the digital circuit 10 other than the filter 16, and using the information of each selected filter 16, which is automatically entered from the stored data.

When the total scores for all possible filters are obtained, in step S7, the filters are ranked from high score to low score. Since the input signal, which is subjected to Fourier expansion, is expressed in terms of a sum of a plurality of sine waves, the scores are determined by general linear computation using a personal computer without requiring a large-scale or middle-scale computer.

In step S8, the ranked filters are shown on the display in order from high score to low score. In step S9, one of the displayed filters is selected, and the signal waveform in the case where the selected filter is used is simulated. In step S10, the result is displayed as the signal waveform shown in FIG. 2 and the signal spectrum shown in FIG. 3. The simulation with respect to the filters enables the effects of the ranked filters to be compared, such that a suitable filter is selected.

Such a filter selecting apparatus enables filters suitable for digital circuit 10 to be ranked and displayed once the circuit constants of the digital circuit 10 are set. This facilitates selection of a suitable filter, which prevents a person unfamiliar with noise countermeasures from selecting an unsuitable filter, so as to achieve quick filter selection. In calculating the total scores, the weighting coefficients $a_n$ and $b_n$ can be changed to obtain a selection standard desirable to the person who selects the component, such as a selection method focusing on the noise suppressing effect or a selection method focusing on the signal waveform quality.

Such a program for implementing the method of various preferred embodiments of the present invention preferably can be recorded in a recording medium, such as a CD-ROM (compact disc read-only memory). The program stored in the recording medium, such as a CD-ROM, is then preferably installed in a personal computer, thereby achieving a filter selecting apparatus. The program may also be recorded in any other medium, such as a hard disk of a server computer, so as to allow users to download the program from a web site.

A filter manufacturer distributes a program including data of manufactured filters to customers, thus enabling the customers to select a suitable filter. A user of a digital circuit is able to easily select a suitable filter for the digital circuit from the filters provided by the filter manufacturer who distributes the program. Accordingly, it is beneficial to filter manufacturers in view of sales promotion of filters that the program is distributed to customers via CD-ROM or that the customers be permitted to download the program from a web site.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. A noise suppression component selecting method for selecting a noise suppression component suitable for noise suppression in a digital circuit, the method comprising:
   a step of determining an amplitude and phase of a signal at a given position of the digital circuit when an input signal is input to the digital circuit;
   a step of determining an amplitude and phase of the signal at the given position when the input signal is input to the digital circuit in the case where the circuit includes each of a plurality of noise suppression components;
   a comparing step of comparing, for each order of fundamental and harmonic components, between the amplitude and phase of the signal at the given position determined in the case where the digital circuit includes each of the plurality of noise suppression components and the amplitude and phase of the signal at the given position determined in the case where the digital circuit does not include each of the plurality of noise suppression components;
   a scoring step of scoring, for each order of fundamental and harmonic components, the compared amplitude and phase obtained in the comparing step determined in the cases where the digital circuit includes each of the noise suppression components and does not include each of the noise suppression components; and
   a summing step of calculating a total score by summing the scored amplitude and phase by weighting for each order.

2. A noise suppression component selecting method according to claim 1, wherein the input signal is expanded into a series of sine waves by Fourier expansion before the signal is input to the digital circuit;
   in the scoring step, the signal at the given position is scored considering noise suppression and the signal waveform quality of the signal at the given position; and
   the noise suppression component selection method further includes a ranking step of ranking the noise suppression components from a high score to a low score.

3. A noise suppression component selection method according to claim 2, wherein in the scoring step, different scoring standards are used depending upon the order of the fundamental and harmonic components of the signal at the given position so as to consider the noise suppression and the signal waveform quality.

4. A noise suppression component selecting method according to claim 2, wherein a standard for ranking the noise suppression components by weighting the scores is adjusted by focusing on at least one of the noise suppression in the signal at the given position and the signal waveform quality of the signal at the given position.

5. A program for causing a computer to execute:
a procedure A of recording a circuit constant of a digital circuit;
a procedure B of expanding an input signal to the digital circuit into a series of sine waves by Fourier expansion;
a procedure C of calculating a signal at a given position of the digital circuit using the circuit constant recorded in the procedure A when the input signal expanded into a series of sine waves in the procedure B is input;
a procedure D of recording a circuit constant of the digital circuit in the case where the circuit includes one of a plurality of noise suppression components;
a procedure E of calculating a signal at the given position of the digital circuit using the circuit constant recorded in the procedure D when the input signal expanded into a series of sine waves in the procedure B is input;
a procedure F of determining a difference between the signal obtained in the procedure C and the signal obtained in the procedure E;
a procedure G of scoring an amplitude and phase of the signal difference determined in the procedure F for each harmonic order;
a procedure H of calculating a total score which is a sum of the scores obtained in the procedure G;
a procedure I of implementing the procedures D through G for all of the plurality of noise suppression components to determine the total score in the case where each of the noise suppression components is used; and
a procedure J of ranking the noise suppression components from a high score to a low score based on the total scores obtained in the procedure I.

6. A program according to claim 5, wherein the amplitude and phase are scored using different scoring standards depending upon each harmonic order.

7. A program according to claim 5, wherein the total score is calculated by weighting for each harmonic order.

8. A program according to claim 7, wherein the weighting by which the scores are determined is changed by focusing on at least one of noise suppression in the signal at the given position of the digital circuit and the signal waveform quality of the signal at the given position.

9. A computer-readable recording medium having the program according to claim 5 recorded thereon.

10. A noise suppression component selecting apparatus comprising a computer in which the program according to claim 5 is installed.

11. A program for causing a computer to execute:
a procedure K of recording a circuit constant of a digital circuit;
a procedure L of expanding an input signal to the digital circuit into a series of sine waves by Fourier expansion;
a procedure M of recording a circuit constant of the digital circuit in the case where the circuit includes one of a plurality of noise suppression components;
a procedure N of calculating a signal at a given position of the digital circuit using the circuit constant recorded in the procedure M when the input signal expanded into a series of sine waves in the procedure L is input;
a procedure O of determining a difference between the input signal expanded into a series of sine waves in the procedure L and the signal obtained in the procedure N;
a procedure P of scoring an amplitude and phase of the signal difference determined in the procedure O for each harmonic order;
a procedure Q of calculating a total score which is a sum of the scores obtained in the procedure P;
a procedure R of implementing the procedures M through Q for all of the plurality of noise suppression components to determine the total score in the case where each of the noise suppression components is used; and
a procedure S of ranking the noise suppression components from a high score to a low score based on the total scores obtained in the procedure R.

12. A program according to claim 11, wherein the amplitude and phase are scored using different scoring standards depending upon each harmonic order.

13. A program according to claim 11, wherein the total score is calculated by weighting for each harmonic order.

14. A program according to claim 13, wherein the weighting by which the scores are determined is changed by focusing on at least one of noise suppression in the signal at the given position of the digital circuit and the signal waveform quality of the signal at the given position.

15. A computer-readable recording medium having the program according to claim 11 recorded thereon.

16. A noise suppression component selecting apparatus comprising a computer in which the program according to claim 11 is installed.

* * * * *